United States Patent [19]

Giuseppe

[11] Patent Number: 4,836,724
[45] Date of Patent: Jun. 6, 1989

[54] CUTTING DIAMOND MACHINE FOR ORNAMENTALLY MACHINING CHAINLETS AND PROVIDED WITH A DEVICE PERMITTING A VICE SHAFT TO BE ROTATED AND/OR SHIFTED AXIALLY, AND AN ENGRAVING DEVICE EFFECTING VARIOUS MACHINING MOVEMENTS

[76] Inventor: Cassan Giuseppe, Via Monticello 4, Arcugnano (Vicenza), Italy

[21] Appl. No.: 114,408

[22] Filed: Oct. 28, 1987

[51] Int. Cl.⁴ .............................................. B23C 9/00
[52] U.S. Cl. .................................................... 409/144
[58] Field of Search ........................................ 409/144

*Primary Examiner*—Léon Scott, Jr.
*Attorney, Agent, or Firm*—Ladas & Parry

[57] ABSTRACT

The present cutting diamond machine comprehends a lower actuating unit (1) which makes a chain vice rotate in trips and shift vertically up and down alternately in order that the chain itself is brought in contact or not with an upper engraving device. The lower unit (1) has suitable eccentrics (8, 12) which are connected with the axis of rotation of the vice through connecting rods. A particular upper tool holder head is applied on the cutting diamond machine. By means of this head there is the possibility of obtaining rotations coupled according to horizontal and vertical axes of the tool holder itself, which rotations permit to carry out various ornamental decorations on the chainlet to be machined.

7 Claims, 2 Drawing Sheets

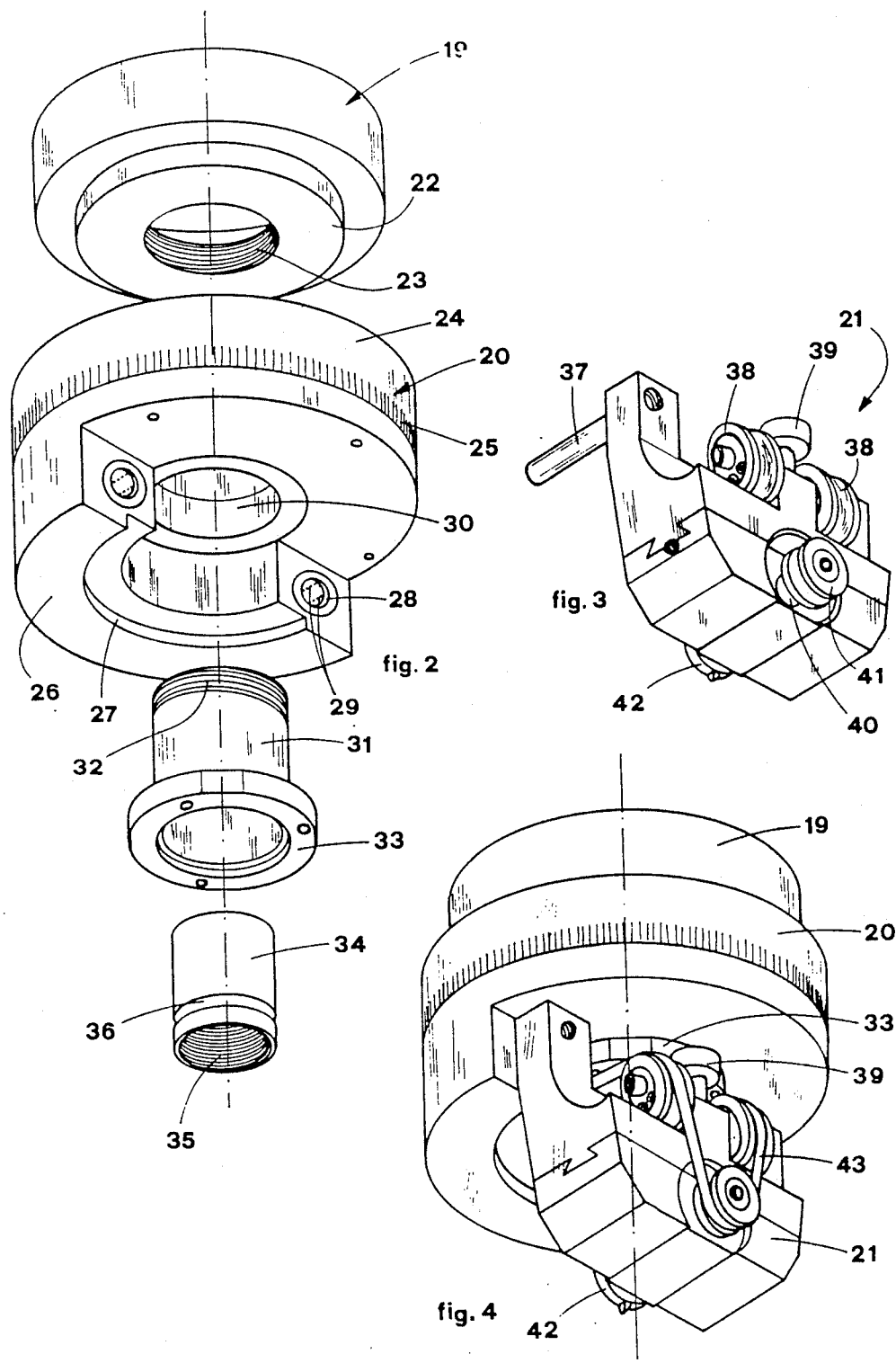

CUTTING DIAMOND MACHINE FOR ORNAMENTALLY MACHINING CHAINLETS AND PROVIDED WITH A DEVICE PERMITTING A VICE SHAFT TO BE ROTATED AND/OR SHIFTED AXIALLY, AND AN ENGRAVING DEVICE EFFECTING VARIOUS MACHINING MOVEMENTS

The present invention relates to a cutting diamond machine, provided with a device permitting a vice shaft to be rotated and/or shifted axially in order that the vice itself may be advanced, shifted vertically up and down and turned intermittently. These movements may be executed independently or coupled according to the kind of machining to be carried out on the chainlet. Moreover the cutting diamond machine according to the present invention is provided with an engraving device to be mounted on a spindle of the machine itself. Different synchronized, predetermined engraving movements may be carried out by means of this engraving device. In order to obtain particular ornamental machinings or decorations on chainlets or the like, conventional cutting diamond machines provide a series of independent devices which regulate the movements of the cutting device and the movements of the vice supporting the chainlet, as well. The motion is imparted to these devices by means of single motors and several complicate transmissions comprehending very encumbering arms, fixed or partially mobile.

The embodiment of the present patent of invention makes the above-mentioned movements simpler and better. Moreover the present invention permits a great number of operations of the engraving device and units supporting the chainlet to be machined. In this manner a great number of ornamental decorations is permitted.

In fact, the invention relates to a cutting diamond machine for ornamentally machining chainlets or the like, characterized in that for comprehending a series of aligned elements which impart the chain vice a vibrating vertical motion, as well as an advancing intermittent rotating motion, these elements including a middle shaft which is connected at a side by means of bushes to a rotating pulley, and at the other side to a vibrating body; the rotating pulley may cooperate with a pawl arranged in the inner part of the pulley itself so that to engage or disengage an eccentric for permitting the vice to be advanced intermittently; the vibrating body consisting of a pair of eccentrics which may put the middle shaft rotation axis off-centre, the cutting diamond machine comprehending also a tool holder which consists of various rotating parts assembled in a unit; the supporting device consisting of a first middle part, fixed and essentially cylindrical, with an opening for housing a middle cam element or the like; a rotating body, which moves independently, is mounted on the first middle part, and a mobile engraving body supporting the tool is mounted on the rotating body itself.

The invention will be better understood from the following specification, given as an example not restricting the invention, as well as from the accompanying drawings in which:

FIG. 2 is a schematical exploded view of the tool holder components with vertical axis;

FIG. 3 is a schematical perspective view of the engraving unit inserted in the previous tool holder;

FIG. 4 is a schematical perspective view of the unit assembled.

Figure 1:
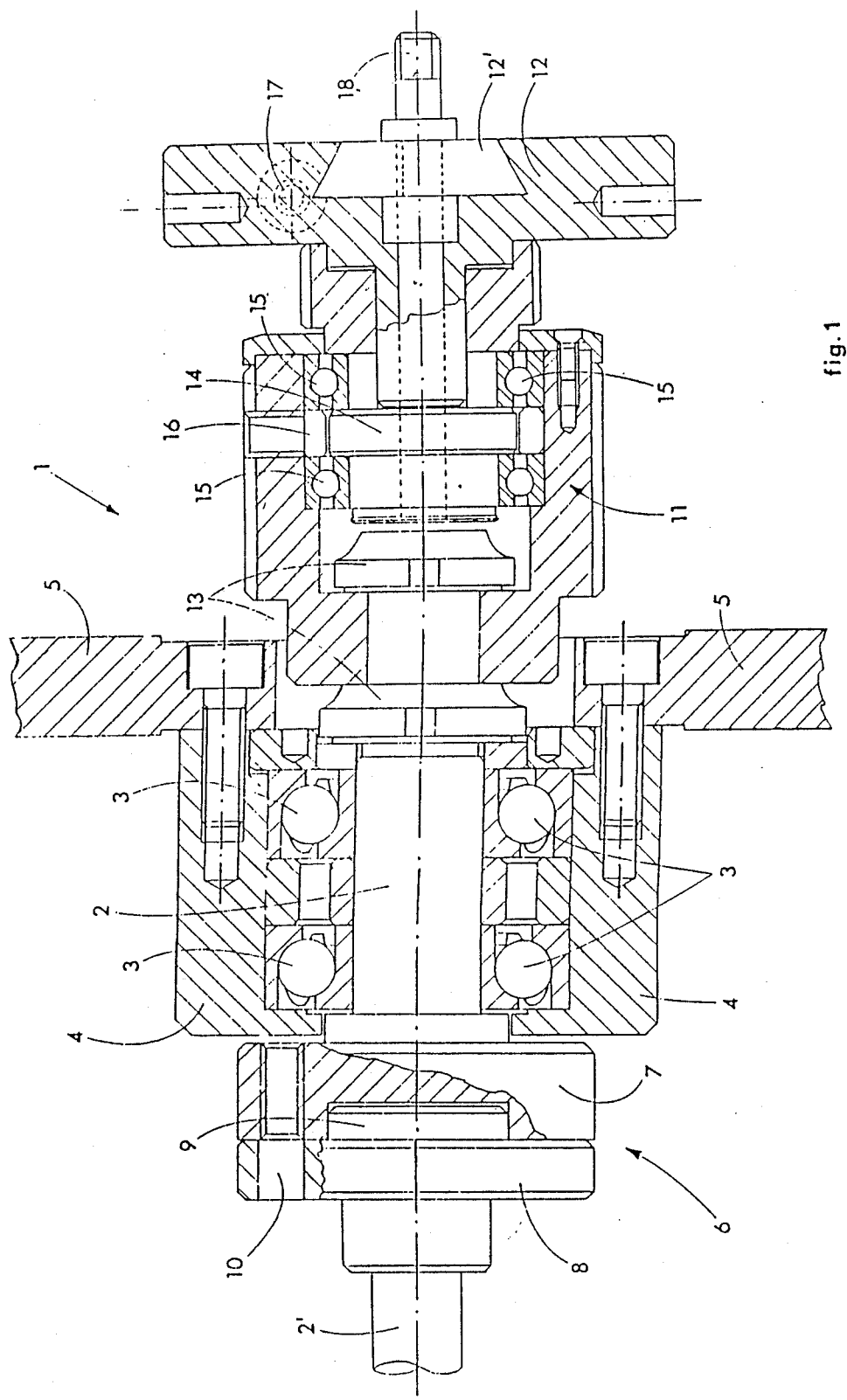
FIG. 1 is a schematical side view of the rotating device provided with eccentrics for the shifting and intermittent advancing of the shaft axis.

With reference to FIG. 1, number 1 denotes the assembly of the rotating spindle, this assembly consisting essentially of a shaft 2 with horizontal axis. The shaft 2 rotates in ball bearings 3 included in a cylindrical box 4. The box 4 is part of a fixed supporting structure 5.

According to FIG. 1 and with respect to the box 4, the left of the shaft is interested by a vibrating device, indicated as a whole with number 6, on the outer surface of the shaft itself. The vibrating device 6 comprehends a cylindrical part 7, which rotates coaxially with respect to the shaft 2, as well as a part 8, which may be put off-centre by means of eccentrics 9. In its turn, the part 8 is fixed to a secondary small shaft 2', which is connected to the rotating unit of the chain vice by means of a connecting rod, the stroke of which may be regulated. The secondary small shaft 2' may be shifted with respect to the axis of rotation of the main shaft by regulating adjusting screws 10, so that the aforesaid connecting rod may be shifted in a vibrating manner. Vertical vibrations of the vice, more or less wide according to the required kind of machining, may be obtained by suitably regulating the decentering of the part 8. The part, opposite the vibrating device 6, of the shaft 2 is interested by a driving pulley 11 which may cooperate with a further eccentric 12'. The rotating motion is imparted to the pulley by means of a toothed belt.

The pulley 11, hollow in its inner part, is fixed to the rotating shaft 2 by means of locking bushes 13 and comprehends a pawl 14, fixed to the disk 12 and idling on a ball bearing 15. Moreover, the pawl 14 may be locked in the pulley 11 by means of a catch 16 and rotates with the pulley itself. The catch 16 is in contrast with conventional screws which are regulated from the outside. Thus the rotation of the eccentric 12' is permitted and regulated by means of an adjusting screw 17. A decentrable extension 18 of the eccentric 12' is connected in its turn to a further connecting rod which permits the vice shaft to axially rotate with a trip motion. In this way the vice itself moves with a trip motion.

It may be deduced from the above description that the whole driving device of the vice operates in such a way that when the vice is in its lowering phase (through the part 8), the vice itself effects an advancing rotation, determined by the eccentric 12'. On the contrary, when the whole driving device rotates in the opposite direction, with respect to the previous direction, the rotating vice reaches its highest point. Furthermore, all the driving components are arranged on the same horizontal axis, and the connection or release of both eccentrics, simult neously or separately, permits various vice movements to be carried out according to the required kind of machining.

The eccentrics may be regulated in millimeters, and for this reason very high rotation and vibration speeds of the vice are possible, the stability of the machine being maintained. In fact, the rotation speed imparted is inversely proportional to the off-centre space of the eccentrics.

As an advantage, the cutting diamond machine is provided with a particular tool holder to be mounted on the upper head of the machine itself.

The tool holder, as it appears in FIG. 2, is obtained by coupling two parts, indicated with 19 and 20, which form a sole body together with a unit 21 provided with engraving means described below.

The part 19 consists of a hollow, cylindrical body showing a circular rim 22 on its lower part. Moreover, in the middle of the part 19 there is a threaded opening 23. The part 20 consists of a circular rim 24 in the inner part of which there is a ball bearing, not shown in the figure, which supports the rim 22. The part 20 is provided also with an annular seat 25 on its outer surface, and with a semi-circular projection 26 on its lower surface. The semi-circular projection 26 shows a groove 27 and two parallel holes 28, the holes being perpendicular to the axis of the cutting diamond machine spindle. Bushings 29 are put in these holes, and their purposes will be described below.

The part 20 also is provided in its middle with an opening 30 through which a little cylinder 31 is inserted. An upper end 32 of the little cylinder 31 is threaded and is screwed in the opening 23.

A cam 33 or ring, the pitch of which is different according to the kind of machining, is mounted on the other end of the little cylinder 31 by known systems. A further hollow cylindrical element 34 is inserted in the little cylinder 31 and is provided with inner thread 35 and an annular seat 36, which is obtained near an end of the cylindrical element itself. The assembling of the tool is accomplished by mounting the unit 21 which supports the engraving device. Small shafts 37 are mounted on the unit 21 and inserted in the holes 28, where the small shafts slide in the bushings 29.

The same task of the small shafts 37 may be carried out by means of guides, slides, or the like. The unit 21 is provided with gear rollers 38 and a feeler 39 on the upper and front parts respectively. The feeler 39 is interested by a cam 33. In the lower part, the unit 21 is crossed by a pin 40 which rotates on bushings. The pin 40 is provided with a roller 41 on its outer end, whereas an engraving device 42 is mounted on the inner end of the pin 40.

A connecting little belt 43 is provided for transmitting the motion, interests the rollers 38 and 41 of the unit 21 and is inserted in the seat 36 of the little cylinder 34.

FIG. 4 shows the described components assembled together, so that the rotating part 20 is inserted in the part 19, and is kept in contact with the same by screwing the cam cylinder 31 in the threaded opening 23.

The hollow cylindrical element 34 is inserted in the opening of the little cylinder 31 and screwed directly in the vertical spindle shaft (not shown in the figure), so that the seat 36 juts slightly out of the cam 33. When the spindle is actuated, the little cylinder 34 rotates and imparts circular motion to the pin 40 and the engraving device 42 through the little belt 43. At the same time, it is possible through further drive means a a drive belt interesting the seat 25 to impart the rotation to the part 20, which moves independently with respect to the cylindrical element 34 and permits the unit 21 to rotate around its vertical axis and simultaneously shift on the small shafts 37. Thus, during the engraving phase, there is a cooperation between the described rotations and movements, and the circular rotation of the engraving device 42, along a horizontal axis.

Moreover, there are sensors that, in synchronism with the cutting diamond machine movements, permit the part 20 to alternately rotate to and fro according to the wished angle, even a round angle. Another advantage consists in the possibility of changing the cam 33 on diversifying thus the translation of the unit 21 and, as a consequence of this, also the translation of the engraving device 42.

I claim:

1. An actuating device, in a cutting diamond machine for ornamentally. machining chainlets, connected by connecting devices to a supporting vice on said cutting diamond machine, said supporting vice holds the chainlet to be machined and is movable both latitudinally and longitudinally by the actuating device with respect to an engraving device, said actuating device comprising:
   a supporting structure, attached to the machine, having a first set of ball bearing arranged in an inner portion of the supporting structure;
   a shaft, rotating on said first set of ball bearing, within said supporting structure and having a first end and a second end;
   a vibrating body, to move the supporting vice with respect to the engraving device, having a first independently rotatable part that is connected to the first end of the shaft and a second part connected to a secondary shaft, said second part has a first adjustment mechanism to adjust an axis of rotation of the secondary shaft with respect to an axis of rotation of said shaft, said secondary shaft contacts the connecting devices; and
   a rotating body attached to the second end of the shaft and having a hollow pulley connectable to a drive means, said pulley having a lockable coupling means positioned within an inner portion of said pulley, said coupling means is connected to an adjustable rotating part having an extension shaft that is engageable with said connecting devices, the axis of rotation of said extension shaft is movable by a second adjustment mechanism in said adjustable rotating part, with respect to the axis of rotation of said shaft, so that the pulley can drive the adjustable rotating part and the extension shaft to move the supporting vice.

2. A device according to claim 1, wherein a disk part on said adjustable rotating part is connected to the coupling means and has an eccentric part, connected to the extension shaft, that can be moved by the second adjustment mechanism so that the extension shaft can be moved.

3. A device according claim 2, wherein the second part is eccentrically shaped.

4. A device according to claim 3, wherein the coupling means consists of a pawl, rotating on a second set of ball bearings, and catches, said pawl is connected to the disk part.

5. A device according to claim 1, wherein the vibrating body and the adjustable rotating part act in unison to move the supporting vice.

6. A device according to claim 1, wherein the vibrating body and the adjustable rotating part act independently to move the supporting vice.

7. A device according to claim 4, wherein the axes of rotation for the secondary shaft and the extension shaft are moved, with respect to the axis of rotation of the shaft, in millimeter gradations.

* * * * *

UNITED STATES PATENT AND TRADEMARK OFFICE
CERTIFICATE OF CORRECTION

PATENT NO. : 4,836,724

DATED : JUNE 6, 1989

INVENTOR(S) : Guiseppe CASSAN

It is certified that error appears in the above-identified patent and that said Letters Patent is hereby corrected as shown below:

Title page, Column 1, Item [76] Inventor:
   delete "CASSAN Guiseppe" and insert -- Guiseppe CASSAN --

Item [30] Insert -- Foreign Application Priority Data
October 29, 1986   IT   Italy...63349 B/86

Signed and Sealed this

Seventeenth Day of December, 1991

Attest:

HARRY F. MANBECK, JR.

*Attesting Officer*            Commissioner of Patents and Trademarks

UNITED STATES PATENT AND TRADEMARK OFFICE
CERTIFICATE OF CORRECTION

PATENT NO. : 4,836,724

DATED : JUNE 6, 1989

INVENTOR(S) : Giuseppe CASSAN

It is certified that error appears in the above-identified patent and that said Letters Patent is hereby corrected as shown below:

Title page, Column 1, Item [76]

Inventor: change "Guiseppe" to --Giuseppe Cassan--.

Signed and Sealed this

Fifteenth Day of June, 1993

Attest:

MICHAEL K. KIRK

*Attesting Officer*    Acting Commissioner of Patents and Trademarks